(12) United States Patent
Leogrande et al.

(10) Patent No.: US 7,455,495 B2
(45) Date of Patent: Nov. 25, 2008

(54) SYSTEMS AND METHODS FOR MONITORING THERMAL GROWTH AND CONTROLLING CLEARANCES, AND MAINTAINING HEALTH OF TURBO MACHINERY APPLICATIONS

(75) Inventors: John A. Leogrande, West Hartford, CT (US); Peter L. Jalbert, Granby, CT (US); C. Bruce Wood, Ellington, CT (US); Matthew J. Schryver, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 560 days.

(21) Appl. No.: 11/204,490

(22) Filed: Aug. 16, 2005

(65) Prior Publication Data

US 2007/0043497 A1 Feb. 22, 2007

(51) Int. Cl.
*F01D 11/20* (2006.01)
(52) U.S. Cl. .......................................... 415/1; 701/100
(58) Field of Classification Search ....................... None
See application file for complete search history.

(56) References Cited

U.S. PATENT DOCUMENTS 4,326,804 A * 4/1982 Mossey ...................... 356/623
4,384,819 A * 5/1983 Baker ........................... 415/14
4,644,270 A * 2/1987 Oates et al. ............. 324/207.25
4,876,505 A * 10/1989 Osborne ................. 324/207.25
5,818,242 A 10/1998 Grzybowski et al.
6,487,491 B1 11/2002 Karpman et al.
2005/0088171 A1* 4/2005 Gualtieri ................. 324/207.26

* cited by examiner

*Primary Examiner*—Richard Edgar
(74) *Attorney, Agent, or Firm*—Bachman & LaPointe, P.C.

(57) ABSTRACT

A system and method for determining thermal growth of motor or engine parts to thereupon control the clearance of motor or engine fan blades is disclosed herein. In addition, a system and method for monitoring the health of a turbine engine, its components and sub-components is also described herein. The system(s) and method(s) described herein permit continuous monitoring during the life of the engine for radial clearances and blade and rotor vibration problems, which will assist in correcting and retaining performance for a longer on-wing time in operation. In addition, inconsistent engine-to-engine performance variations due to component tolerances, engine operation characteristics, and operation during extremes in ambient temperatures can be eliminated or significantly minimized when employing the system(s) and method(s) described herein.

23 Claims, 4 Drawing Sheets

SYSTEMS AND METHODS FOR MONITORING THERMAL GROWTH AND CONTROLLING CLEARANCES, AND MAINTAINING HEALTH OF TURBO MACHINERY APPLICATIONS

GOVERNMENT INTERESTS

The U.S. Government has certain rights in this application pursuant to Contract No. F33615-98-C-28012 awarded by the Department of the Air Force.

FIELD OF THE INVENTION

The present invention generally relates to a system and method of clearance control of motor or engine fan blades, and more particularly relates to a system and method of determining thermal growth of motor or engine parts to thereupon control the clearance of motor or engine fan blades.

BACKGROUND OF THE INVENTION

The knowledge and control of radial growth of turbo-machinery components has long been a stumbling block on the way to achieving higher efficiency and stability levels demanded by the designers of gas turbine engines, pumps and compressors. This undesirable situation is driven in part by lack of reliable, accurate and affordable sensors for measuring radial growth. Alternatively, the radial growth can be computed using a mathematical model that relates growth to various turbomachine measured and otherwise obtained parameters. Numerous attempts were made in the past to devise such an algorithm. However, none of the known algorithms delivered required steady state and transient accuracy, ability to calibrate the equations to high fidelity data and formulation suitable for implementation in a digital computer.

Imperfect control of the clearance between a turbine engine fan blade and case can result in either the clearance being too loose or the clearance being too tight resulting in excessive rubs. In either instance, imperfect clearance results in loss of performance (e.g. engine efficiency, thrust) and/or violation of the engine operating limits (e.g. exhaust gas temperature overshoot) and/or reduced compressor stability. Standard practice has been to design a clearance control system to prefer loose clearance over tight clearance which may also result in damage to the blades and case. Some engines such as, for example, the PW4000 use an open loop clearance control system that sacrifices significant performance in comparison with a "perfect" clearance control system. Other engines such as, for example, the V2500 use a closed loop system that relies on crudely modeled clearances and therefore sacrifices less performance, but still falls short of ideal clearance control.

Improved accuracy and reliability in estimating tip clearances will also enable the clearance control system to be active during those parts of an airplane mission that are more likely to experience abrupt changes in operating conditions. For example, a typical active clearance control system is traditionally deactivated during airplane takeoff where tip clearances are particularly hard to predict due to rapidly changing engine operating conditions. This approach worked well in the past for the cases where takeoff constituted a relatively small portion of the overall airplane mission and the engine stability margins were conservatively high. In contrast, takeoff fuel economy gains importance for the engines designed for short haul aircraft applications such as, for example, PW6000 designed for A318 application. The ability to deploy active clearance control during takeoff also increases the exhaust gas temperature margin which otherwise diminishes with increased clearance, and helps to avoid clearance induced stability loss. Thus, it is desirable to further improve clearance control accuracy to, in turn, improve engine performance while maintaining all operating limits, compressor stability and ensuring reliable rub-free operation throughout the airplane mission.

The principal difficulty in modeling clearances for a closed loop system resides in modeling the thermal growths of the engine components, not in modeling the mechanical strains which are relatively easy to calculate. Thermal growths are far more difficult to model because the physical configurations of the engine components and the multiple time varying influences to which those components are subjected (i.e., throttle transients, multiple fluid streams of different and time varying temperatures, flow rates, etc.) complicate the problem of modeling the heat transfer and energy storage phenomenon.

For instance, engine components each experience thermal growth at their own respective pace due to their location with the engine housing, varying operating conditions including temperatures, shaft speeds, fluid stream exposure. As a result one component may experience a greater amount of thermal growth than another component such that one area of the gas turbine engine may experience a greater amount of thermal growth than another area. In turn, the internal wall of the engine housing opposite these varying areas of thermal growth on the gas turbine engine will also experience varying amounts of thermal growth due to the inconsistent heat transfer occurring between engine components. As a result, one area of the internal wall of the engine housing may exhibit a greater amount of thermal growth and correspondingly a smaller clearance as opposed to another area of the engine housing. At that point the obstacles pertaining to modeling the heat transfer and energy storage phenomenon of a gas turbine engine become more apparent.

To that end there is a need for systems and methods directed to controlling thermal growth, maintaining clearance control and monitoring the health of turbomachinery applications.

SUMMARY OF THE INVENTION

In accordance with the present systems and methods disclosed herein, a method of controlling clearance in a turbomachine broadly comprises providing a closed loop sensed active clearance control system comprising three or more microwave-based sensors disposed adjacent to and opposing one or more components and sub-components of the turbomachine; determining from a measurement an actual amount of thermal growth on one or more components and the sub-components using the active clearance control system; determining from a measurement an actual amount of clearance between each of the one or more components and sub-components and a wall adjacent to and opposing the one or more components and sub-components where thermal growth is present using the active clearance control system; and controlling the amount of clearance based on a difference between a desired amount of clearance and the actual amount of clearance for each of the one or more components and sub-components as determined by the thermal growth using the active clearance control system.

A method for monitoring the health of a turbomachine broadly comprises providing a closed loop sensed active time-of-arrival monitoring system disposed in a wall adjacent to and opposing one or more components and sub-components of the turbomachine; determining from a measurement a speed of a rotor of a turbine engine of the turbomachine; determining from the rotor speed an expected time-of-arrival of the one or more components and sub-components using the active time-of-arrival monitoring system; determining from a measurement an actual time-of-arrival of the one or more components or sub-components at one or more positions using the active time-of-arrival monitoring system; comparing the actual time-of-arrival with the expected time-of-arrival of the one or more components and sub-components using the active health monitoring system; determining from the comparison an absence of or a presence of a change in time-of-arrival of the one or more components and sub-components using the active time-of-arrival monitoring system; and assessing from the comparison the health of the one or more components and sub-components using the active time-of-arrival monitoring system.

A system for controlling clearance in a turbomachine broadly comprises means for determining from a measurement an actual amount of thermal growth on one or more components and the sub-components using the active clearance control system; means for determining from a measurement an actual amount of clearance between each of the one or more components and sub-components and a wall adjacent to and opposing the one or more components and sub-components where thermal growth is present using the active clearance control system; and means for controlling the amount of clearance based on a difference between a desired amount of clearance and the actual amount of clearance for each of the one or more components and sub-components as determined by the thermal growth using the active clearance control system.

A turbine engine system broadly comprises a turbine engine including a case and blades rotatable within the case; means for determining from a measurement an actual amount of thermal growth on one or more components and the sub-components using the active clearance control system; means for determining from a measurement an actual amount of clearance between each of the one or more components and sub-components and a wall adjacent to and opposing the one or more components and sub-components where thermal growth is present using the active clearance control system; and means for controlling the amount of clearance based on a difference between a desired amount of clearance and the actual amount of clearance for each of the one or more components and sub-components as determined by the thermal growth using the active clearance control system.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is a graph indicating the change in the round trip phase of a signal reflected by a blade tip and measured by the microwave sensor of FIGS. 3 and 4 in the system of FIGS. 2 and 3; and.

Like reference numbers and designations in the various drawings indicate like elements.

DETAILED DESCRIPTION OF THE INVENTION

Figure 1:
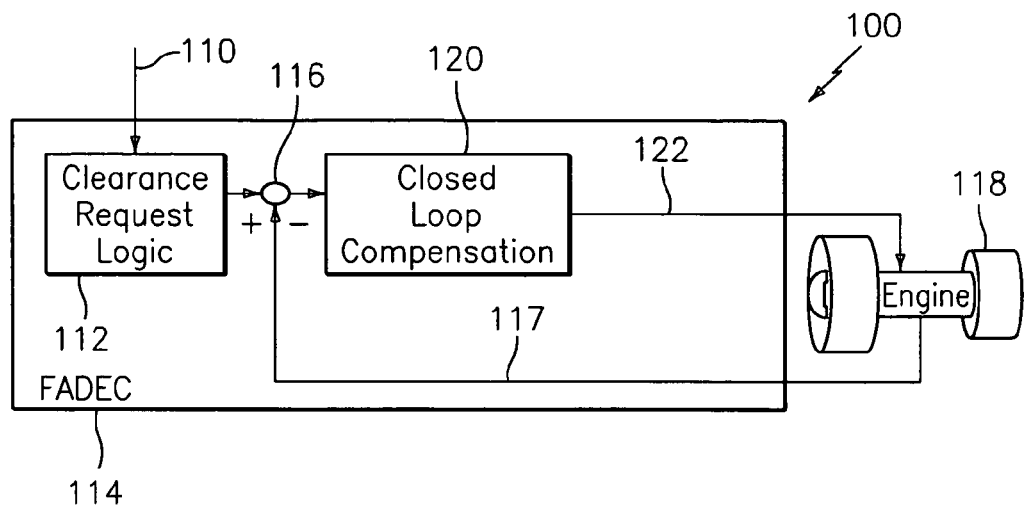
FIG. 1 depicts a representation of an exemplary closed loop sensed active system employing microwave-based sensors.

A system and method for determining thermal growth of motor or engine parts to thereupon control the clearance of motor or engine fan blades is disclosed herein. In addition, a system and method for monitoring the health of a turbine engine, its components and sub-components is also described herein. Increasing radial clearances caused by the blade tips rubbing into the outer airseals and/or erosion are common root causes of a loss of engine performance. Early detection of problems with turbo machine blades and/or rotors enables avoidance of component failures. The system(s) and method(s) described herein permit continuous monitoring during the life of the engine for radial clearances and blade and rotor vibration problems, which will assist in correcting and retaining performance for a longer on-wing time in operation. In addition, inconsistent engine-to-engine performance variations due to component tolerances, engine operation characteristics, and operation during extremes in ambient temperatures can be eliminated or significantly minimized when employing the system(s) and method(s) described herein.

The exemplary system and method of use for determining thermal growth of motor or engine parts to thereupon control the clearance of motor or engine fan blades will be described first. In one embodiment, the sensing system utilizes microwave energy directed through a passage within a sensing body or probe out towards the tips of a rotating blade to measure an actual, or real-time, radial clearance as the blade passes by an electromagnetic field generated in the vicinity at the exit of the passage. The system will process the feedback signals and output data to accurately turn on and/or off an actuation system capable of responding to input from the controller for modulating the radial clearance between the rotating blades and static components of the turbine.

The system may act as a stand alone component in a turbomachinery application or incorporated into a gas turbine Electronic Engine Control ("EEC") system such as, but not limited to, a Full Authority Digital Engine Control system ("FADEC"), and the like, that oversees the entire turbomachinery application, e.g., a civilian, commercial or military aircraft. In either format, the EEC and the system are directly linked in order to receive information contemporaneously concerning all engine performance parameters related to the turbomachinery application. The EEC may provide information including, but not limited to, determining fluid streams that exchange heat with a component or a sub-component of the turbomachine and providing temperature(s) and flow rate (s) for each fluid stream that exchanges heat with a component and sub-component; determining component and sub-component performance parameter correlations such as temperatures, pressures, and shaft speeds; determining component and sub-component heat transfer performance parameters such as shaft speeds, pressures, temperatures; and, determining the steady state growth of the turbomachine components and sub-components each as a weighted average of growths resulting from thermal exchange with fluid streams of varying temperatures, flow rates and thermophysical properties where weighting factors include heat transfer performance parameters and the like.

The system is capable of simultaneously measuring radial clearance and time-of-arrival of each blade as the blade passes by a microwave air-path (blade-tip) clearance system. Multiple microwave sensors of the system are positioned in a predetermined circumferential spacing around a blade row. The microwave air-path (blade-tip) clearance system measure and provide information concerning how the position, clearance space and time-or-arrival vary for each blade within a row. Time-of-arrival should directly correlate with engine motor revolutions per minute ("rpm") provided there is no blade vibration present. The system ensures this correlation by accurately measuring variations in blade time-of-arrival at multiple angle locations and comparing these variations to expected time-of-arrival measurements at known speeds. The result is that tighter operating clearances can be implemented with confidence throughout the operating regime or cycle of the engine.

Referring specifically now to FIG. 1, a system 100 for determining thermal growth of motor or engine parts to thereupon control the clearance of motor or engine fan blades is depicted. As represented, flight conditions and engine power setting data 110 may be relayed to a clearance request logic algorithm 112 of an EEC system 114 containing system 100. Algorithm 112 may process data 110 and transfer data 110 to a junction 116 where a measured tip clearance data 117 may be received from a turbine engine 118. The combined data 110 and 117 may be transferred from junction 116 to a closed loop compensation algorithm 120 that may control via a command 122 a valve (not shown) utilized for diverting an auxiliary or cooling air flow from a fan stream onto an engine case (not shown) housing turbine engine 118 for cooling the engine case in order to provide a desired clearance between the case and the engine blades. System 100 provides the measured tip clearance data 117 using the system and methods which will now be described in greater detail.

Referring now to FIGS. 2-5, microwave sensing system 100 is generally disposed within a non-rotating gas turbine engine case structure and its components. System 100 may be, and preferably is, in direct communication with a gas turbine engine 130 generally including a fan 132, a compressor 134, a turbine 136 and a modulation system for cooling the engine case which will be discussed in greater detail. Compressor 134 may be a low pressure compressor or a high pressure compressor depending upon whether a low pressure or high pressure turbine is being utilized. One or more rows of blades (not shown) may be mounted on rotors (not shown) employed in fan 132, compressor 134 and turbine 136 or other area(s) of turbine engine 130.

Microwave sensing system 100 may generally comprise a controller 140, a microwave source 142, a signal buffer 144, a processor 146, a record buffer 148 and a waveguide multiplexor 150 in communication with the microwave air-path clearance system disposed within engine 130 in addition to other electronic components known to one of ordinary skill in the art. As mentioned, system 100 may stand alone or may be incorporated into an EEC 114. In either embodiment, system 100 receives information concerning engine performance parameters and other related data transferred from one or more engine sensors 190 to controller 140. As system 100 monitors the thermal growth of the components and sub-components of engine 130, system 100 modulates the flow of one or more fluid streams in and around the housing of engine 130 using a modulation system comprising, for example, a torque motor 192 and an actuator 194 that are in communication with both engine 130 and controller 140.

Residing in controller 140 is the control software that includes, but is not limited to, logic that determines high pressure turbine clearance and a control algorithm that determines the angle of actuator 194 in response to the difference between the desired and the actual clearance. Controller 140 directs directly and/or indirectly the performance and interaction of the components within system 100 and between system 100 and engine 130.

Generally, controller 140 sends a command 158 to processor 146 to initiate determining the location of a component or sub-component, for example, a blade and the measurement of the blade's clearance to the wall adjacent to and opposing the blade. Controller 140 may contemporaneously send a command 160 to waveguide multiplexor 150 to initiate the microwave air-path (blade-tip) clearance system integrated within a wall adjacent to and opposing one or more blades of the rows of blades of the rotors configured within fan 132, compressor 134 and turbine 136. The microwave air-path (blade-tip) clearance system communicates with multiplexor 150, and the other components, using coaxial cables 184 or other similar devices for transmitting signals and/or commands and/or transferring data. Processor 146 initiates a signal transfer 160 to signal buffer 144. Controller 140 may send a clear command 162 to signal buffer 144 and/or initiate a frequency selection command 164 prior to the signal transfer being initiated. Signal buffer 144 may forward frequency selection 164 to microwave source 142 where source 142 generates an amount of microwave radiation 166 sufficient for determining the location of a blade and measuring the clearance of the blade.

The microwave radiation generated 166 is relayed to the microwave air-path (blade-tip) clearance system as microwaves 168 through a source 170 of waveguide multiplexor 150. The microwave air-path (blade-tip) clearance system is described in U.S. Pat. No. 5,818,242 to Grzybowski et al., assigned to United Technologies Corporation, which is incorporated herein by reference in its entirety.

Figure 3:
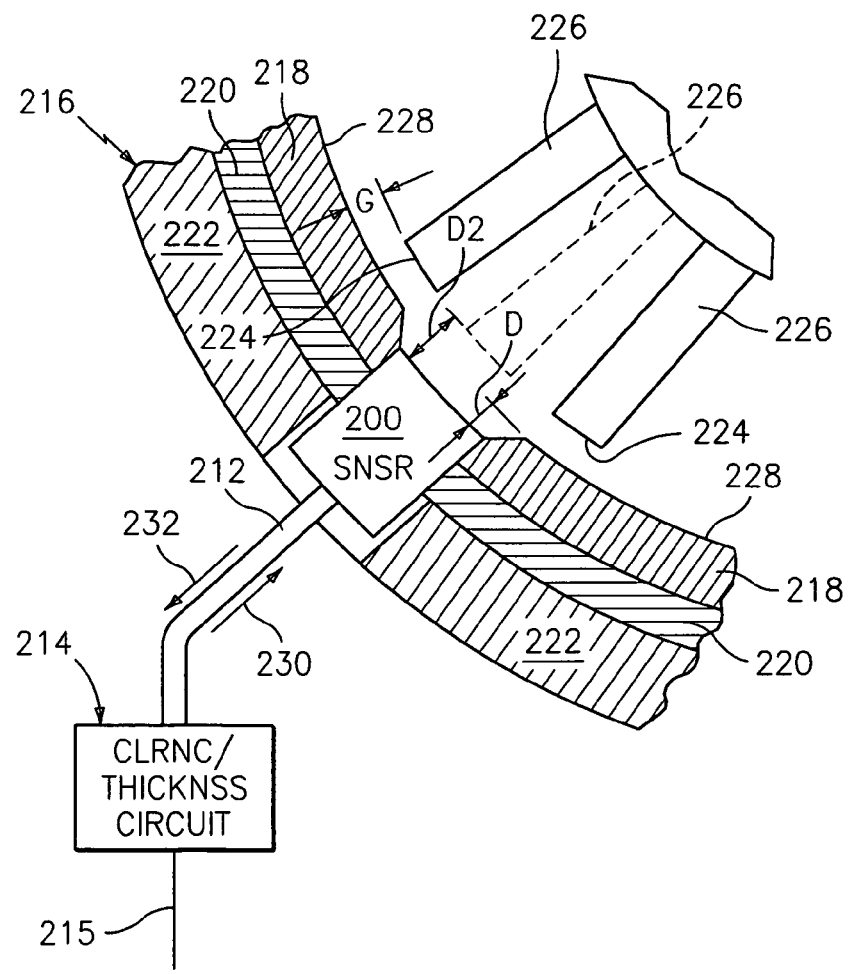
FIG. 3 is a schematic block diagram of an air-path (or blade tip) clearance microwave sensor of FIG. 2, a clearance/thickness circuit and electrical connections therebetween.
Figure 2:
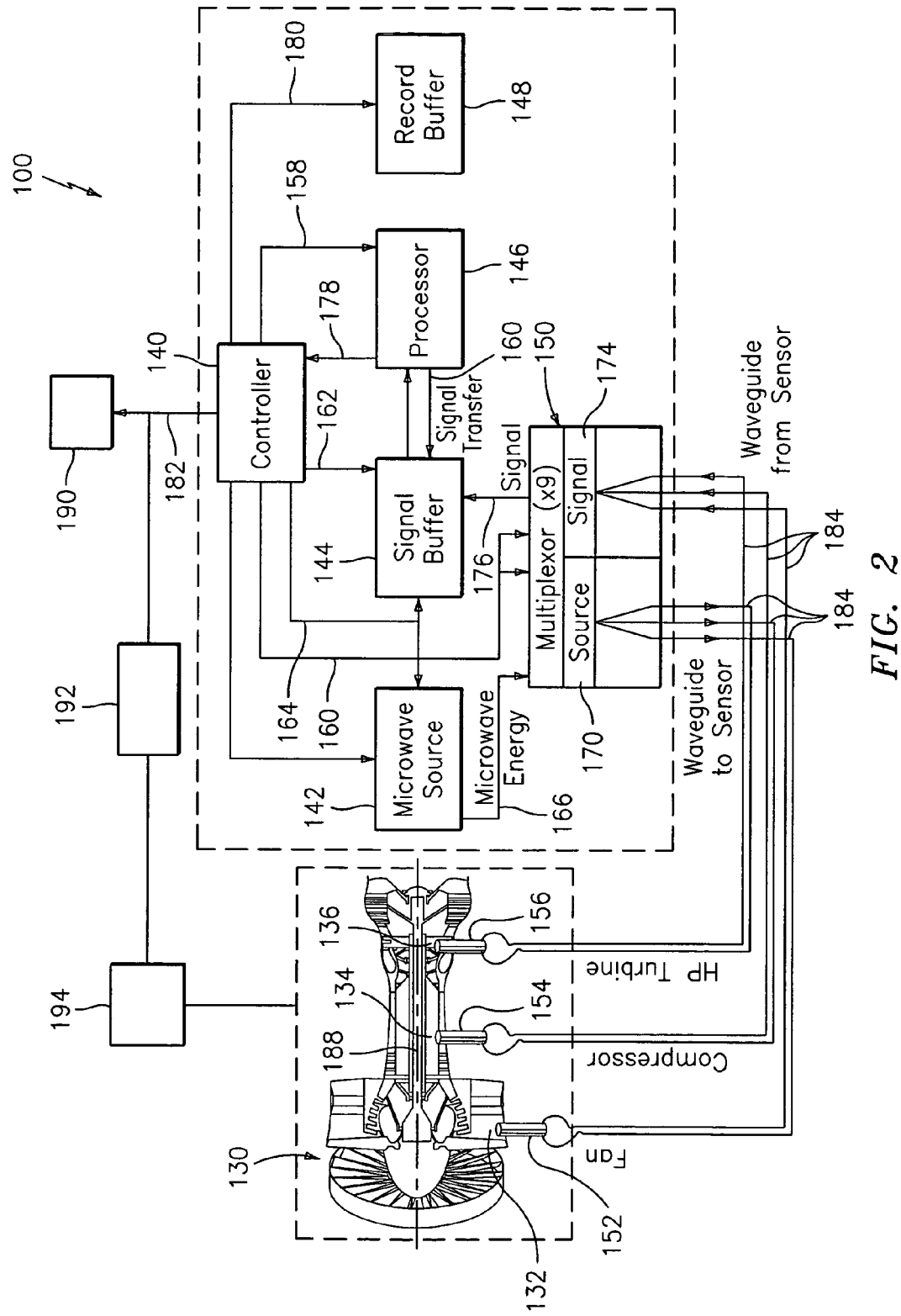
FIG. 2 depicts a representation of an exemplary closed loop sensed active system for controlling thermal growth, maintaining clearance control and monitoring the health of turbo machinery applications.

Referring specifically now to FIG. 3, a microwave air-path (or blade-tip) clearance sensor system for use in the systems and methods described herein comprises one or more microwave air-path clearance sensors 200 in which each sensor 200 is connected to one end of a coaxial cable 212, e.g., a standard coaxial microwave transmission line, having a characteristic impedance of approximately 50 ohms. The coaxial cable 212 allows a transmit (or excitation) microwave signal 230 to be transmitted to the sensor 200 and a receive (or return or reflected) microwave signal 232 to be received from the sensor 200. The coaxial cable 212 is connected on the other end to a clearance/thickness circuit 214 which provides and receives the microwave signals 230, 232 to and from the sensor 200, respectively. Other coaxial cables or transmission mediums and/or impedances may be used if desired.

One or more sensors 200 are mounted in a housing (or casing) 216 of an engine. The inner-most region of the engine housing 216 comprises an abradable seal 218 (i.e., a seal capable of rubbing or wearing away) made of an abradable high temperature electrically conductive metal, and a seal back plate 220 made of a high temperature electrically conductive material, e.g., Inco 718 (comprising nickel, cobalt and steel). The seal 218 and the plate 220 each have a thickness of about 0.1 inches (2.54 mm). Other thicknesses and materials may be used for the seal 218 and plate 220. The remaining outer portion of the housing 216 is indicated by a numeral 222 and may comprise many sections and layers of materials as is known. Other materials for the seal 218 may be used if desired. Also, the regions 218, 220, 222 may be made of the same material or more than one material if desired.

The sensors 200 are recessed within an inner surface 228 of the abradable seal 218 by a predetermined recess distance or thickness D, e.g., 25-50 mils (0.635-1.27 mm). Other distances may be used for the distance D, if desired. As the seal 218 wears, the recess distance D decreases. To avoid blade contact with sensors 200, the distance D should be set to be greater than the maximum distance that the seal 218 will be allowed to wear before replacement of the seal 218.

Sensors 200 detect the amount of wear of the seal 218 which occurs, i.e., the reduction in the thickness D. Also, sensors 200 detect the air-path clearance (G) between a tip 224 of a blade 226 and the inner surface 228 of the seal 218 (as discussed hereinafter).

Figure 4:
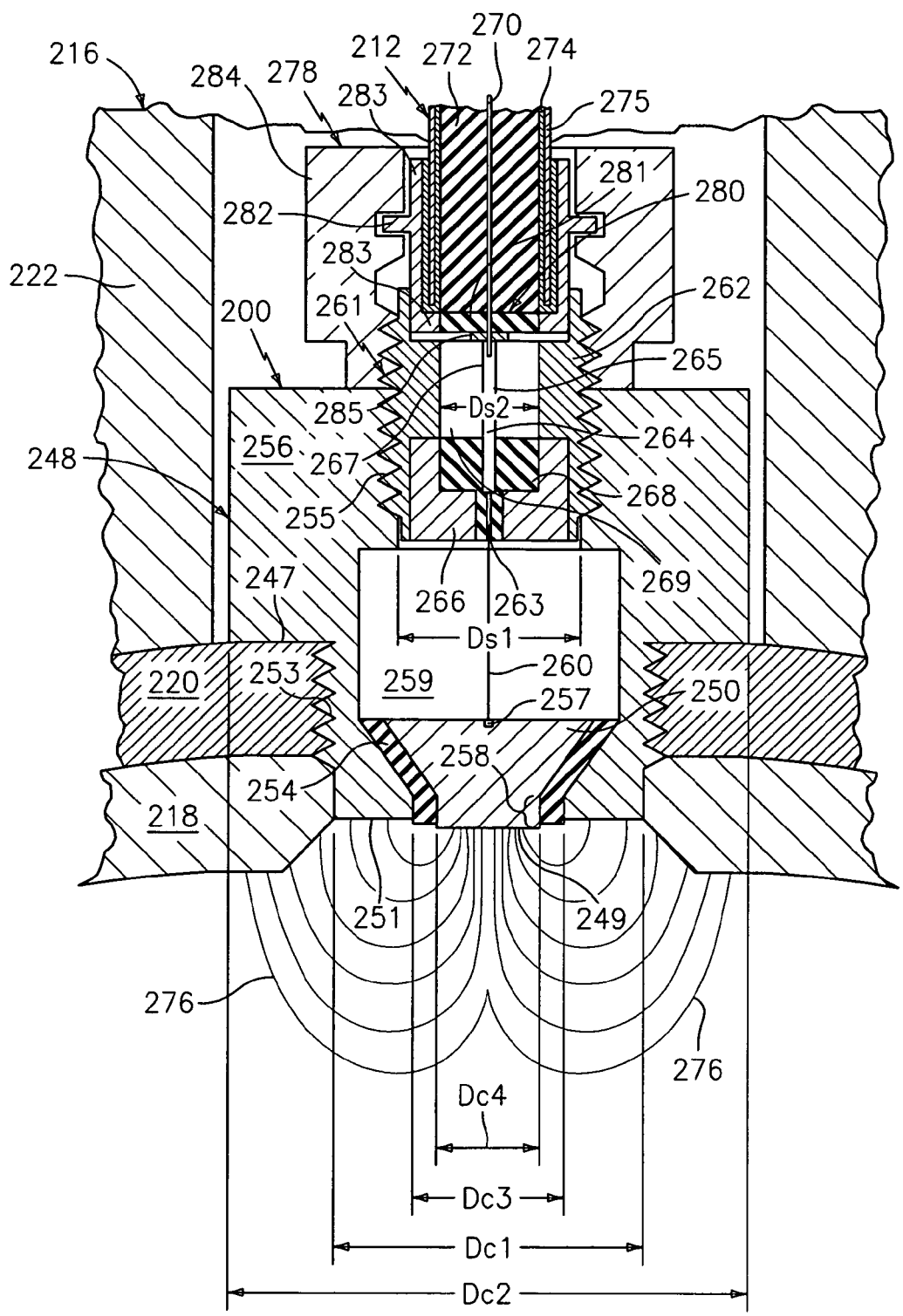
FIG. 4 is a cross-sectional view of an air-path (or blade tip) clearance microwave sensor when no blade is in front of the sensor.

Referring specifically now to FIG. 4, each sensor 200 comprises a sensing assembly 248, a spark plug assembly 261, and an electrical connecting wire 260 connecting the two assemblies 248, 261. The sensing assembly 248 comprises a center conductor 250 which is electrically connected to a center conductor 270 of the coaxial cable 212 (as discussed hereinafter). Outside and concentric with the conductor 250 is an insulator 254 made of a high temperature ceramic, such as alumina. Outside and concentric with the insulator 254 is an electrically grounded outer conductor 256. The sensing assembly 248 is connected to the plate 220 by screw threads 253 and connected to the spark plug assembly 261 by threads 255. Instead of the threads 253, each sensor 200 may be inserted through a hole in the plate and seal 218 and the outer portion 222 of the engine case 216 may be partially threaded to accept the sensor 200. Each sensor 200 may be fitted with a seal, such as air tight threading tape or a gasket at an interface 247 between the upper surface of the plate 220 and the assembly 248, so as to minimize leakage through the seal 218. Other techniques may be used to minimize leakage if desired. Also, the inner conductor 250, the insulator 254, and the outer conductor 256 may be bonded together with an adhesive, such as a ceramic adhesive, to minimize movement. Alternatively, the length L of the outer conductor 256 may be long enough such that it extends out beyond the outer region 222 of the casing 216. Other techniques for affixing each sensor 200 into the seal 218 may be used if desired.

The dimensions of the inner conductor 250, the insulator 254, and the outer conductor 256 may be selected, in conjunction with the choice of microwave frequency, to: (1) avoid higher order radial and circumferential propagating electromagnetic modes; (2) suppress electromagnetic radiation from the open end of the sensor 200 (facing the blades 226); (3) reduce direct coupling between the inner conductor and the outer conductor which would reduce fringing electric fields; and/or (4) maximize the sensitivity of each sensor 200 to the blades 226 over the expected range of air gaps (G) without introducing excessive losses. Such characteristics are not required but provide best performance.

For example, for a 20 GHz sensor excitation, the outer conductor 56 is a hollow tapered cylinder and has outer diameters Dc1, Dc2 of about 0.9 cm and 1.5 cm, respectively. The larger outer diameter Dc2 provides a stop for the insertion of the sensor 10. If desired, the outer conductor 256 may have one common outer diameter Dc1 instead of two different outer diameters Dc1, Dc2. The inner diameter Dc3 of the outer conductor 256 near the conductor 250 (which is also the outer diameter of the insulator 254) tapers down from a value of about 6 mm down to about 5 mm. The center conductor 250 is a solid tapered cylinder and has a diameter Dc4 (which is also the inner diameter of the insulator 254) of about 4 mm at the widest point and tapers to about 3 mm. The length of a straight portion 258 is about 1 mm and the angle of taper is about 30 degrees from the vertical. The taper helps keep the inner conductor 250 and insulator 254 from falling out of the outer conductor 256. The overall length L of the outer conductor 256 is about 17 mm. Other lengths, angles and dimensions may be used if desired.

The insulator 254 protrudes toward the blades 226 a distance of about 1 mil (0.0254 mm) from a lower face 251 of the outer conductor 256. Also, the inner conductor 250 protrudes toward the blades 226 a distance of about 2 mils (0.05 mm) from the lower face 251 of the outer conductor 256. Such protrusion of the inner conductor 250 and the insulator 254 is not required but helps increase the sensing range of the sensor by increasing the extension of the fringing electric fields.

Other dimensions and shapes for the parts 250, 254, 256 may be used if desired. Generally, the higher the excitation frequency, the smaller the allowable dimensions. Also, in general, the larger the surface area of the face 249 of the conductor 250 facing the blades 226, the more intense and the larger the extension of the fringing fields 276, and the more resolution and sensitivity to changes in seal thickness and air-gap clearance.

The connecting wire 260 is an electrically conductive wire which extends from a small insertion hole 257 in the top side of the conductor 250 to the bottom side of the spark plug assembly 261. A region 259 around the wire 260 between the wire 260 and the inner diameter of the outer conductor 256 is air. The wire 260 is about 7 mm long and has a diameter of about 0.64 mm (8 mils). Other lengths and diameters may be used if desired for the wire 260 provided the impedance is substantially matched to the connecting parts 248, 261. Also, the region 259 may be filled with a material other than air, such as a high temperature ceramic material designed for substantially matched impedance. Alternatively, the conductor 250 may have a conductive portion protruding upwardly which connects to the conductor 264. Other conductive connecting interfaces may be used to connect the spark plug assembly 261 to the sensing assembly 248 if desired.

The spark plug assembly 261 may be a K Connector®, Part No. K102F made by Wiltron or an equivalent 50 ohm connector. The assembly 261 is about 8 mm long and has an outer diameter Ds1 of about 5 mm. The assembly 261 is secured by the screw threads 255 into the upper portion of the outer conductor 256. The assembly 261 comprises an outer conductor (or spark plug) 262, a center conductor 264, a cylindrical conductor bead 266, which is slid into and in electrical contact with the spark plug 262, and an insulator 268 between the center conductor 264 and the conductor bead 266. The spark plug assembly 261 is designed to maintain an impedance which substantially matches that of the coaxial cable 212 (i.e., 50 ohms). The center conductor 264 is cylindrical and an upper portion 265 of the conductor 264 protrudes about 5 mm upwardly from the bead 266 and the insulator 268. A region 269 around the protruded portion 265 between the portion 265 and an inner diameter Ds2 of the spark plug 262 is air. The inner diameter Ds2 is about 3 mm. Materials other than air may be used if desired provided the impedance is matched. Also, the center conductor 264 is hollow at each end to provide insertion holes 263, 267 for connection to other conductors. The lower insertion hole 263 of the conductor 264 has the wire 260 inserted therein and the upper insertion hole 267 has a center conductor 270 of the coaxial cable 212 inserted therein. Other lengths, shapes, dimensions, and diameters of the spark plug assembly 261 or any portion thereof may be used if desired.

The coaxial cable 212 comprises the center conductor 270 surrounded by an electrical insulator 272. The insulator 272 is surrounded by an electrically grounded shield conductor 274 which is surrounded by an outer insulator 275. A portion of the shield 274 is folded over the outer insulator 275 and an end cap 280 is secured to the shield 274 and to the end of the cable 212. The end cap 280 has an insulating portion 281, which the conductor 270 passes through, and a conductive portion 283. The conductive portion 283 of the end cap 280 has a flange 282 extending radially therefrom and a nut 284 is rotatably mounted to the flange 282. Also, there is a conductive washer 285 disposed on the end cap 280 and connected to the conductor 270. The threaded inner portion of the nut 284 is screw threaded onto the threaded upper outer portion of the spark plug 262 by the screw threads 255. When the coaxial cable 212 is connected to each sensor 200, the conductor 270 extends into the upper insertion hole 267 of the protruding portion 265 of the conductor 264. The drawing in FIGS. 4 and 5 are not drawn to scale.

The impedance seen by the coaxial cable 212 from the conductor 270 to the inner conductor 250 is substantially 50 ohms. Instead of the sensing assembly 248, the spark plug assembly 261 and the connecting wire 260, any other configurations, dimensions, shapes, and materials to that described herein may be used to make up each sensor 200 or any portion(s) thereof provided it is a coaxial microwave transmission media having an impedance substantially matched to that of the coaxial cable 212.

Figure 5:
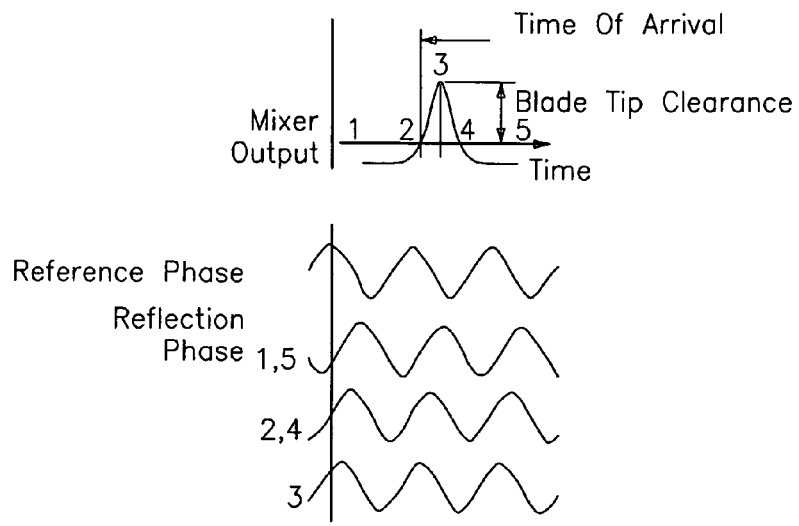

Referring now to FIG. 5, the microwave energy passes through each sensor 200, strikes and then reflects off of a tip of one or more blades as reflected microwave energy 190 at one or more of blade tip positions indicated. For example, the blade tips travel about the rotor, the blade may be found at any one of the five (5) positions at various time intervals. Each reflected microwaves 190 may possess a different phase when compared to the microwave radiation generated 166 depending upon the position and distance of the blade tip relative to the microwave air-path (blade-tip) clearance sensor 200. As illustrated, each reflected microwave 190 possesses a different phase relative to the reference as a result of being reflected from a different location on the rotating blade tip back towards the sensor. The distance between the tip of a blade and the wall adjacent to and opposing the blade may be mathematically calculating by comparing the energy and phase shift of the reflected waveform to that of the reference signal.

Microwave air-path (blade-tip) clearance sensors 200 may operate asynchronously or alternately be linked or multiplexed to read the clearance of each blade relative to the wall adjacent to and opposing the blades. Multiple microwave air-path (blade-tip) clearance sensors 200 may be spaced circumferentially to ascertain any non-uniformity in the clearance so that system 100 can modulates the flow of one or more fluid streams in and around the housing 216 of engine 130 using a modulation system comprising, for example, a torque motor 192 and an actuator 194, and control the clearance to a uniform distribution.

Microwave air-path (blade-tip) clearance sensors 200 receive the reflected microwaves 190 and relay the information via coaxial cables 184 to a signal processor 174 of waveguide multiplexor 150. The reflected microwaves 190 may be translated by signal processor 174 into phase data using one or more mathematical algorithms as known to one of ordinary skill in the art. Signal processor 174 of waveguide multiplexor 150 may relay the phase data as a signal 176 to signal buffer 144 where buffer 144 may temporarily store signal 176 before relaying signal 176 to processor 146. Processor 146 may employ one or more mathematical algorithms to determine the location and clearance measurement of blade 226 based upon the phase data. Once determined, processor 146 may relay the location and clearance measurement data 178 to controller 140. Controller 140 temporarily stores the location and clearance measurement data of blade 226, and of all of the rows of blades 226 of the rotors being measured, using a data transfer 180 to record buffer 148. In the meantime, controller 140 relays the location and clearance measurement data 178, including other pertinent and relevant data acquired, as an output 182 to the turbo machinery application itself. Record buffer 148 may temporarily store the location and clearance measurement data 178 for each component and sub-component measured, or alternatively, or in addition to, may archive data 178. Such an archival and retrieval system can enable a user to monitor the location and clearance information of the components and sub-components during their lifetime of use.

In another embodiment, a system and method for monitoring the health of the components and sub-components of a turbine engine is described herein. The system and method described herein detects variations in blade passing frequencies, thus indicating any of the following damage or failure conditions that may be present.

(1) detection of bent, cracked or worn blades including cracks in blade rotor attachments;
(2) presence of damaged or bent blade tips;
(3) detection of flutter and/or resonance vibration modes;
(4) indication of turbine shaft main bearing condition;
(5) measurement of lack of turbine/case concentricity and turbine precessing in case; and
(6) measure precession through sub-harmonics of blade tip clearance oscillations.

Referring again generally to FIGS. 2-5, microwave sensing system 100 may also be employed to monitor the health of one or more components and sub-components of the turbomachinery application. The above-referenced damage or failure conditions may be discovered through analyzing the waveforms of reflected microwaves 190 returning from the components and sub-components, for example, one or more blades, and/or monitoring the time-of-arrival as each component and sub-component, for example, one or more blades, passes by and reflects microwaves 168 emanating from microwave air-path (blade-tip) clearance sensors 200 in succession.

System 100 may measure a first time of arrival by initiating microwave source 142 as described and reflecting microwaves off of one or more components or sub-components, for example, one or more blades. As depicted in the representation of FIGS. 3 and 5, a plurality of microwave air-path (blade-tip) clearance sensors 200 may log the first time of arrival measurement from reflected microwaves 190 off of blade 226 at a first time measured in milliseconds relative to an index. A second sensors 200 may log a second time of arrival measurement from the same blade 226 at a second time relative to an index. The plot of FIG. 5 depicts a how time-of-arrival may be ascertained from the reflected microwave 172 from the microwave sensors 152, 154, and 156. System 100 then compares the first time of arrival measurement with the second time of arrival measurement. Based upon this comparison, system 100 detects the absence or presence of a change in the frequency of the component or sub-component, for example, blade 226, and whether one or more damage or failure conditions are present in the component or sub-component.

For example, a blade 226 arriving too early or too late when traveling from a sensor position to another may indicate blade 226 may be cracked. In another example, a shift in the phase of the signal of reflected microwaves 172, otherwise know as a periodic change, may indicate blade 226 may be experiencing vibrational or torsional forces. Over an appreciable amount of time either type of force may eventually cause damage or failure conditions.

Microwave air-path (blade-tip) clearance sensors 200 may all be linked or multiplexed, while synchronously reading the position and location of each blade tip. Synchronous readings allow the system 100 to collect at least three measurements for each blade during a single revolution. A non-synchronous array of sensors would only provide a single measurement of each blade during a single revolution. As described, microwave air-path (blade-tip) clearance sensors 200 are preferably integrally mounted to engine housing 216 or within turbine engine 130 adjacent to and opposing blades 226. In addition, microwave air-path (blade-tip) clearance sensors 200 may be disposed circumferentially within close proximity to one another. It should be noted that employing less than three microwave sensors will not provide the advantages with respect to synchronous measurements as not enough measurements will be taken during a single revolution with less than three sensors 200. In another embodiment, a plurality of sets of microwave air-path (blade-tip) clearance sensors 200, each set comprising three or more sensors 200, may be circumferentially disposed about and preferably integrally disposed within the wall adjacent to and opposing the blades. Microwave air-path (blade-tip) clearance sensors 200 may be disposed at an angle in the same plane as a centerline 188 of the gas turbine engine 130, and preferably axially disposed in a line or strip of three or more microwave air-path (blade-tip) clearance sensors 200 within the same plane as the engine centerline.

Figure 6:
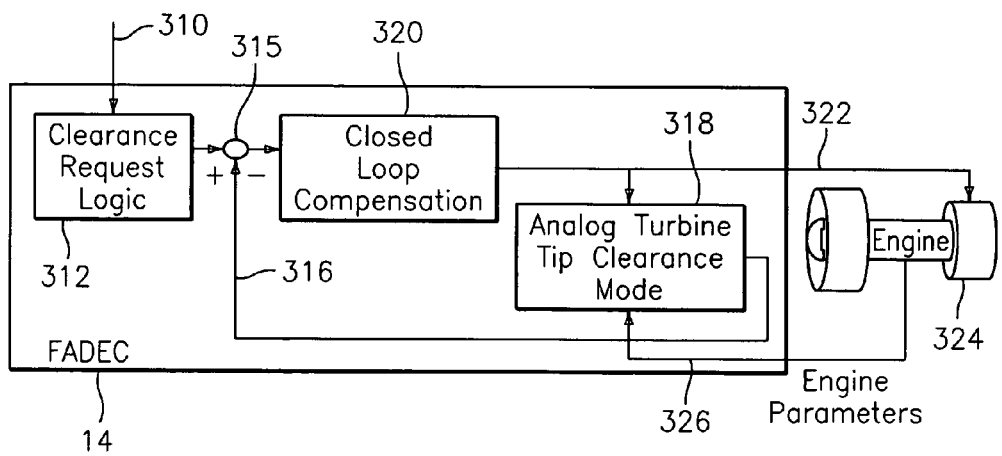
FIG. 6 depicts a representation of a closed loop analog model-based active clearance control system employing engine sensed parameters of the prior art.

Referring now to FIG. 6, in yet another alternative embodiment, the systems and methods for monitoring thermal growth and controlling clearances, and maintaining health of turbomachinery applications described herein may all further comprise a redundancy measure, for example, an analog clearance model, as described in U.S. Pat. No. 6,487,491 ("'491 patent") to Karpman, to serve as a back-up system and/or check measurements. Karpman patent discloses a system and method describing how an accurate estimate of the actual clearances in a turbomachine can be made with a real time mathematical model on-board engine controller. As illustrated in FIG. 6, flight conditions and engine power setting data 310 was relayed to a clearance request logic algorithm 312 of a FADEC system 314. Algorithm 312 processed data 310 and transferred data 310 to a junction 315 where a calculated tip clearance data 316 was received from an analog turbine tip clearance model 318. Data 310 and 316 was forwarded from junction 315 to a closed loop compensation algorithm 320. Based upon the data received, algorithm 320 provided such data in a transfer 322 to clearance model 318 and controlled the position of a valve (not shown) utilized for diverting an auxiliary or cooling air flow from a fan stream onto an engine case (not shown) housing turbine engine 324 for cooling the engine case in order to provide a desired clearance between the case and the engine blades. In turn, turbine engine 324 would provide an engine parameter data 326 to clearance model 318. The clearance request logic algorithm 312 may comprise the algorithm disclosed in Karpman, which is incorporated by reference herein in its entirety, or any algorithm designed to accurately estimate the actual clearances in a turbomachine using a real time mathematical model as known to one of ordinary skill in the art.

Imperfect control of the clearance between a turbine engine fan blade and case can result in either the clearance being too loose or the clearance being too tight resulting in excessive rubs. In either instance, imperfect clearance results in loss of performance (e.g. engine efficiency, thrust) and/or violation of the engine operating limits (e.g. exhaust gas temperature overshoot) and/or reduced compressor stability. Standard practice has been to design a clearance control system to prefer loose clearance over fight clearance which may also result in damage to the blades and case. Some engines such as, for example, the PW4000 use an open loop clearance control system that sacrifices significant performance in comparison with a "perfect" clearance control system. Other engines such as, for example, the V2500 use a closed loop system that relies on crudely modeled clearances and therefore sacrifices less performance, but still falls short of ideal clearance control.

The methods and systems described herein provide several advantages over analog based closed loop systems and other non-active closed loop systems. One advantage is improved accuracy and reliability in estimating tip clearances and monitoring the health of the components and sub-components of a turbine engine. Another advantage is the ability to enable the clearance control system to be active during those parts of an airplane mission that are more likely to experience abrupt changes in operating conditions such as during airplane takeoff where tip clearances are particularly hard to predict due to rapidly changing engine operating conditions. Yet another advantage is the ability to increase the exhaust gas temperature margin which otherwise diminishes with increased clearance, and help avoid clearance induced stability loss. These advantages all lead to further improving clearance control accuracy, which in turn improves engine performance while maintaining all operating limits, compressor stability and ensuring reliable rub-free operation throughout the airplane mission. Yet another advantage is the systems ability to synchronously measure each blade in a single revolution using three or more sensors as opposed to non-synchronous measurements leading to a single measurement of each blade during a single revolution. Another advantage is the system's ability to receive contemporaneously information concerning the locations and positions of each component and sub-component using three or more microwave based sensors rather than relying upon mathematical modeling to predict heat transfer and energy storage phenomenon. Yet another advantage is the system's ability to modulate the fluid streams flowing in and around the engine housing in order to cool certain areas experiencing a greater amount, or any amount, of thermal growth and exhibiting smaller clearance areas or any clearance area less than a desired clearance area.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A method of controlling clearance in a turbomachine, comprising:
providing a closed loop sensed active clearance control system comprising three or more microwave-based sensors disposed adjacent to and opposing at least one blade of the turbomachine;
determining from a measurement an actual amount of thermal growth of said at least one blade using said three or more microwave-based sensors;
determining from a measurement an actual amount of clearance between each of said at least one blade and a wall adjacent to and opposing said one or more components and sub-components where thermal growth is present using said three or more microwave-based sensors; and controlling said amount of clearance based on a difference between a desired amount of clearance and said actual amount of clearance for each of said at least one blade as determined by said thermal growth.

2. The method of controlling clearance of claim 1, wherein said three or more microwave based sensors are disposed in the same plane as a centerline of a turbine engine of the turbomachine.

3. The method of controlling clearance of claim 2, wherein said three or more microwave-based sensors are axially disposed in the same plane as said centerline of said turbine engine of the turbomachine.

4. The method of controlling clearance of claim 2, wherein said three or more microwave-based sensors are disposed at an angle to said centerline of said turbine engine of the turbomachine.

5. The method of controlling clearance of claim 1, wherein controlling said amount of clearance comprises modulating an amount of fluid stream flow adjacent to said wall in response to the amount of thermal growth.

6. The method of controlling clearance of claim 5, wherein the modulating step comprises:
controlling a valve using a closed loop sensed active clearance control system employing said microwave-based sensors;
diverting said fluid stream adjacent to said wall in response to the amount of thermal growth;
cooling said wall in order to provide a desired clearance between said wall and said at least one blade of said turbine engine.

7. The method of controlling clearance of claim 1, wherein the turbomachine comprises a turbine engine.

8. A method for monitoring the health of a turbomachine, comprising:
providing a closed loop sensed active time-of-arrival monitoring system disposed in a wall adjacent to and opposing at least one blade of the turbomachine;
determining from a measurement a speed of a rotor of a turbine engine of the turbomachine;
determining from said rotor speed an expected time-of-arrival of said at least one blade using said active time-of-arrival monitoring system;
determining from a measurement an actual time-of-arrival of said at least one blade at one or more positions using said active time-of-arrival monitoring system;
comparing said actual time-of-arrival with said expected time-of-arrival of said at least one blade using said active health monitoring system;
determining from said comparison an absence of or a presence of a change in time-of-arrival of said at least one blade using said active time-of-arrival monitoring system; and
assessing from said comparison the health of said at least one blade using said active time-of-arrival monitoring system.

9. A system for controlling clearance in a turbomachine, the system comprising:
means for determining from a measurement an actual amount of thermal growth on at least one blade using three or more microwave-based sensors of an active clearance control system;
means for determining from a measurement an actual amount of clearance between each of said at least one blade and a wall adjacent to and opposing said at least one blade where thermal growth is present using said three or more microwave-based sensors; and
means for controlling said amount of clearance based on a difference between a desired amount of clearance and said actual amount of clearance for each of said at least one blade as determined by said thermal growth.

10. The system of claim 9, wherein said means for controlling comprises means for modulating an amount of fluid stream flow adjacent to said wall in response to the amount of thermal growth.

11. The system of claim 10, wherein said means for modulating comprises:
means for controlling a valve using a closed loop sensed active clearance control system employing said microwave-based sensors;
means for diverting said fluid stream adjacent to said wall in response to the amount of thermal growth; and
means for cooling said wall in order to provide a desired clearance between said wall and said at least one blade a turbine engine of said turbomachine.

12. The system of claim 9, wherein said means for determining from said measurement said actual amount of thermal growth comprises a closed loop sensed active clearance control system employing said microwave-based sensors.

13. The system of claim 9, wherein said means for determining said tip clearance of said at least one blade comprises a closed loop sensed active clearance control system employing said microwave-based sensors.

14. The system of claim 9, wherein said means for controlling comprises a means for modulating an amount of said fluid stream adjacent to the wall in response to said amount of thermal growth measured.

15. The system of claim 14, wherein said means for modulating comprises:
a closed loop sensed active clearance control system employing said microwave-based sensors;
a torque motor in communication with said active clearance control system; and
an actuator in communication with said torque motor, wherein said actuator modulates an amount of fluid stream adjacent to a wall of the engine housing in response to an amount of thermal growth present.

16. The system of claim 9, wherein the turbomachine comprises a gas turbine engine, and the wall opposing the tips of the blades comprises a case of said gas turbine engine.

17. A turbine engine system, comprising:
a turbine engine including a case and at least one blade rotatable within said case;
means for determining from a measurement an actual amount of thermal growth on at least one blade using said active clearance control system;
means for determining from a measurement an actual amount of clearance between each of said at least one blade and a wall adjacent to and opposing said at least one blade where thermal growth is present using said active clearance control system; and
means for controlling said amount of clearance based on a difference between a desired amount of clearance and said actual amount of clearance for each of said at least one blade as determined by said thermal growth using said active clearance control system.

18. The turbine engine system of claim 17, wherein said means for determining from said measurement said actual amount of thermal growth comprises a closed loop sensed active clearance control system employing said microwave-based sensors.

19. The turbine engine system of claim 17, wherein said means for determining said turbomachine tip clearance comprises a closed loop sensed active clearance control system employing said microwave-based sensors.

20. The turbine engine system of claim 17, wherein said means for controlling comprises a means for modulating an amount of said fluid stream adjacent to said case in response to said amount of thermal growth measured.

21. The turbine engine system of claim 20, wherein said means for modulating comprises:

a closed loop sensed active clearance control system employing said microwave-based sensors;

a torque motor in communication with said active clearance control system; and an actuator in communication with said torque motor, wherein said actuator modulates an amount of fluid stream adjacent to a wall of the engine housing in response to an amount of thermal growth present.

22. The turbine engine system of claim 17, further comprising:

at least one sensor for measuring engine speed;

at least one sensor for measuring burner pressure, wherein measurements are generated by said sensors for determining a temperature of at least one blade, a temperature of a fluid stream, and a fluid stream rate.

23. The turbine engine system of claim 17, wherein said turbine engine is a gas turbine engine.

* * * * *